(12) United States Patent
Cox et al.

(10) Patent No.: US 10,207,854 B2
(45) Date of Patent: *Feb. 19, 2019

(54) REUSABLE TRANSPORT PACKAGING

(71) Applicant: INTERNATIONAL BUSINESS MACHINES CORPORATION, Armonk, NY (US)

(72) Inventors: Aaron R. Cox, Tucson, AZ (US); ZhenDe Fu, Shanghai (CN); Lei R. Li, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 45 days.

This patent is subject to a terminal disclaimer.

(21) Appl. No.: 14/095,067

(22) Filed: Dec. 3, 2013

(65) Prior Publication Data

US 2014/0091132 A1 Apr. 3, 2014

Related U.S. Application Data

(63) Continuation of application No. 13/087,698, filed on Apr. 15, 2011, now Pat. No. 8,708,139.

(51) Int. Cl.
*B65D 5/52* (2006.01)
*B65D 81/36* (2006.01)

(52) U.S. Cl.
CPC ............ *B65D 81/36* (2013.01); *B65D 5/52* (2013.01); *Y02W 30/807* (2015.05); *Y10T 29/49716* (2015.01)

(58) Field of Classification Search
CPC ......... B65D 81/36; B65D 5/52; B61D 81/361

USPC ............ 206/586, 453, 457, 45.21; 229/103; 248/174, 176.1, 682, 688
See application file for complete search history.

(56) References Cited

U.S. PATENT DOCUMENTS

| | | |
|---|---|---|
| 1,949,913 A | 3/1934 | Larkin |
| 2,146,421 A | 2/1939 | Davidson et al. |
| 2,240,024 A | 4/1941 | Stone et al. |
| 2,338,567 A | 1/1944 | Abraham |
| 2,663,417 A | 12/1953 | Kincaid |
| 2,680,047 A | 6/1954 | Frum |
| 2,993,633 A | 8/1961 | Keller |
| 3,141,555 A | 7/1964 | Funke et al. |
| 3,606,230 A | 9/1971 | Hargreaves |
| 3,692,174 A | 9/1972 | Ross |
| 4,000,811 A | 1/1977 | Hardison et al. |
| 4,632,345 A | 12/1986 | Barley |
| 4,648,548 A | 3/1987 | Shin |
| 4,875,737 A | 10/1989 | Cardenas |
| 5,375,702 A | 10/1994 | Fiallo |
| 5,553,327 A | 9/1996 | Koecher et al. |
| D375,006 S | 10/1996 | Hakansson |
| 5,647,484 A | 7/1997 | Fleming |
| 5,904,104 A | 3/1999 | Yu |
| 6,352,157 B1 | 3/2002 | Srinivasan |

(Continued)

*Primary Examiner* — Scott McNurlen
(74) *Attorney, Agent, or Firm* — ZIP Group PLLC

(57) ABSTRACT

Transportation packaging may be used to ship or transport a product, such as an electronic device. The transportation packaging may be reused subsequent to the transport of the product by removing a shape defined by a pattern included on the transportation packaging, assembling or altering a portion of the removed pattern, and engaging the assembled pattern with the product. In a particular embodiment, the assembled pattern may provide a usability surface for at least one peripheral device to be used with the electronic device.

20 Claims, 6 Drawing Sheets

(56) References Cited

U.S. PATENT DOCUMENTS

| | | |
|---|---|---|
| 6,491,278 B1 | 10/2002 | Thomsen |
| 6,695,141 B2 | 2/2004 | Kropf et al. |
| 6,819,548 B2 | 11/2004 | Hillis et al. |
| 2005/0000853 A1 | 1/2005 | Rochefort et al. |
| 2009/0250363 A1 | 10/2009 | Anderson |

REUSABLE TRANSPORT PACKAGING

FIELD OF THE INVENTION EMBODIMENTS

Embodiments of the present invention are generally related to transportation packaging for the transport or shipment of contents and the reuse of the packaging associated with the contents.

SUMMARY

In an embodiment of the present invention a method of providing the reuse of transportation packaging for the transport of an electronic device includes providing a pattern on at least one surface of the transportation packaging, the pattern defining a portion of the transportation packaging to be removed from the transportation packaging and assembled. The assembled pattern includes a first portion that engages with a first side of the electronic device and a second portion that engages with a second side of the electronic device.

In another embodiment of the present invention, transportation packaging for transporting an electronic device includes the pattern on at least one surface of transportation packaging that defines a portion of the transportation package to be removed and assembled subsequent to the transport of the electronic device.

These and other embodiments, features, aspects, and advantages will become better understood with reference to the following description, appended claims, and accompanying figures.

BRIEF DESCRIPTION OF THE FIGURES

So that the manner in which the above recited features of the present invention embodiments are attained and can be understood, a more particular description, briefly summarized above, may be had by reference to the various embodiments thereof which are illustrated in the appended figures.

It is to be noted, however, that the appended figures illustrate only typical embodiments of this invention and are therefore not to be considered limiting of its scope, for the invention may admit to other equally effective embodiments.

DETAILED DESCRIPTION OF THE EMBODIMENTS

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
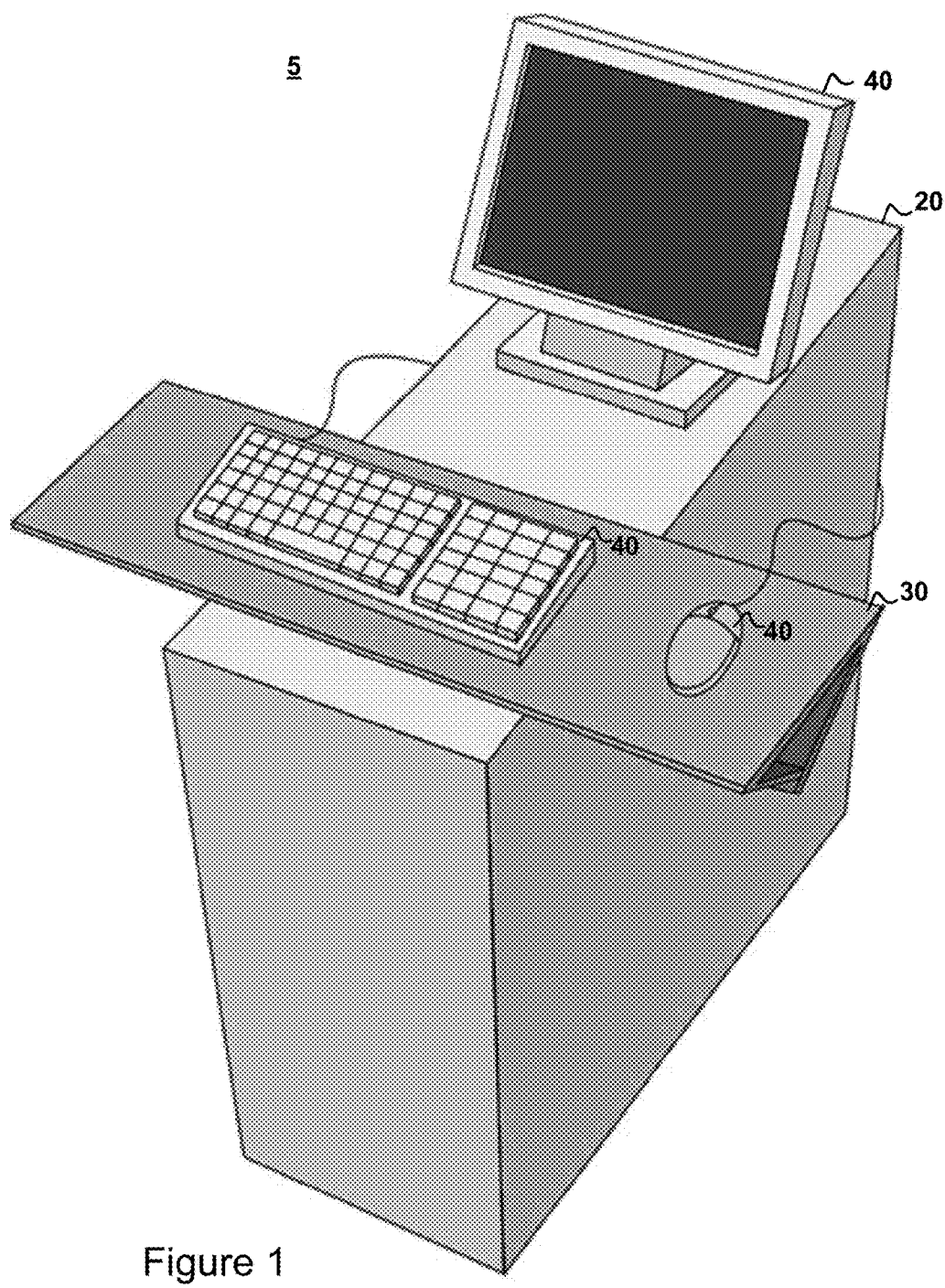
FIG. 1 depicts an electronic system according to embodiments of the present invention.

FIG. 1 depicts an electronic system 5 according to embodiments of the present invention. Electronic system 5 may for example comprise an electronic device 20, a tray 30, and/or one or more peripheral device 40.

Electronic device 20 may be for example a computer, desktop computer, all-in-one computer, server, or tower server, etc. However electronic device 20 may also be an appliance-like device such as a network terminal, a thin client, a terminal-like device, a voice response unit, or television etc. Further electronic device 20 may be a hand held or mobile device such as laptop, notebook, tablet computer or smart phone, etc.

A peripheral device 40 is a device that may be attached to electronic device 20 and may expand the capabilities of electronic device 20. Depending upon the particular device embodied as electronic device 20, peripheral device 40 may be integrated into electronic device 20 or external to electronic device 20. In various applications, for example, peripheral device 40 may be a display, mouse, keyboard, touch screen, hard drive, compact disk/digital video disk drive, game unit, handheld or mobile device, printer, microphone, speaker, motion detector, remote control, etc.

Tray 30 may hold or generally support one or more peripheral devices 40 and comprises a usability surface for supporting a peripheral device 40 and at least one portion that engages with electronic device 20. In certain embodiments tray 30 is assembled from transportation packaging used in the transport and/or shipment of electronic device 20 and is further described herein. In other embodiments tray 30 is used in association with a particular electronic device 20 even though tray 30 was assembled from the transportation packaging of a different electronic device 20.

Figure 2:
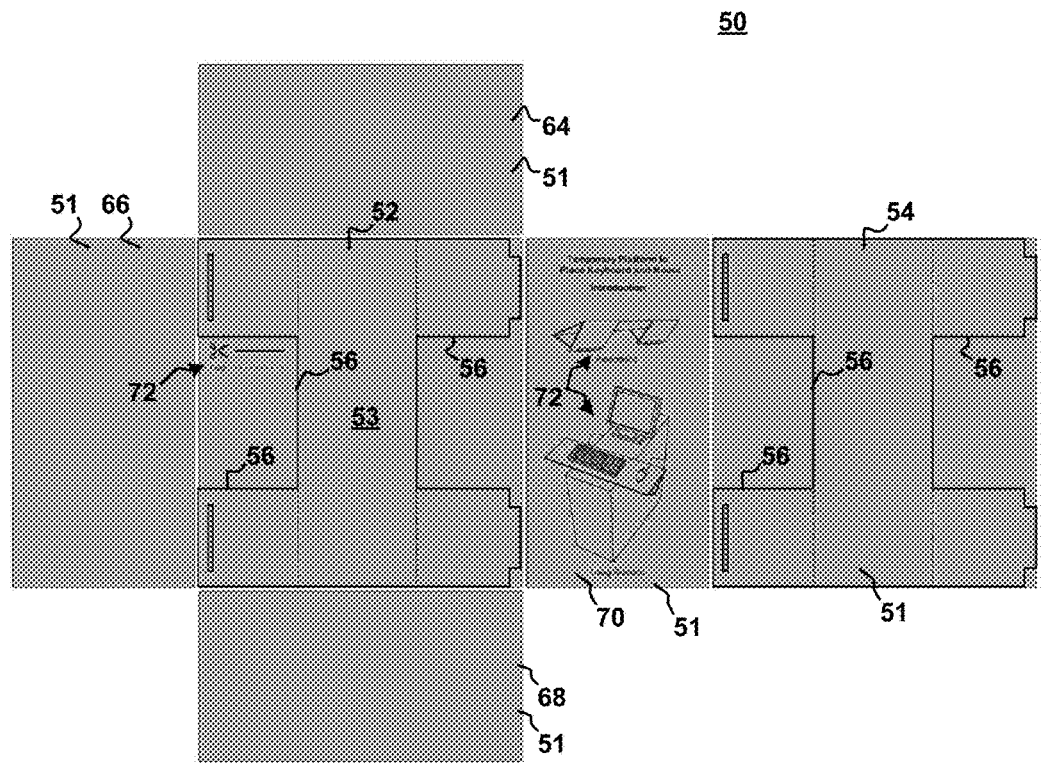
FIG. 2 depicts a flat view of transportation packaging according to embodiments of the present invention.

FIG. 2 depicts an exemplary flat view of transportation packaging 50 according to embodiments of the present invention. In various embodiments, FIG. 2 depicts a transportation packaging 50 blank that has been cut from a larger sheet. Transportation packaging 50 may be made from a paper product of various strengths, ranging from a simple arrangement of a single thick sheet of paper to configurations featuring multiple corrugated and uncorrugated layers. For example, transportation packaging 50 may be made from cardboard, paperboard, containerboard, boxboard, bleached board, chipboard, binder board, fiberboard, sulfate board, corrugated plastic, etc. Transport packaging 50 may ultimately be cut, folded, laminated, printed, etc. and may be shipped to a user that may use the transport packaging 50 as a container for a product (e.g. electronic device 20, etc.).

Transportation packaging 50 may include a base 53 and a plurality of flaps 51. The flaps may be of similar size or one or more flaps 51 may be larger or smaller compared to other flaps 51. The larger flaps 51 may be referred to major flaps and the smaller flaps 51 may be referred to as minor flaps.

Transportation packaging may also include one or more score lines, slots, and/or manufacturer's joints, etc.

Transportation packaging 50 may be, for example, a Regular Slotted Container (RSC). The respective flaps 51 are the same length from score to edge and the major flaps meet in the middle and the minor flaps do not. In other examples, transportation packaging 50 may be a Full Overlap Box that is similar to an RSC but the major flaps overlap, a Half Slotted Container where the bottom or top are used as a cap or base, a Five Panel Folder that has five flaps 51, one of which fully overlaps (the end flaps 51 may or may not also overlap), a Full Telescope Box, a Partial Telescope Box, etc.

As shown in FIG. 2, transportation packaging 50 includes a base 53 and a plurality of flaps 51 which may include a front flap 70, rear flap 66, left flap 68, a right flap 64, and/or a top flap 54. If the front flap 70 & rear flap 66 or left flap 68 & right flap 64 are major flaps, the top flap 54 may be removed. In other words a top may be formed from major flaps 51. The base 53 may be relatively large compared to the flaps 51. Each flap 51 may join the base 53 at a flap-base junction. In certain embodiments the flap-base junction may be scored to enable or aid in later folding.

Transportation packaging 50 may also include a pattern 56 that may be located upon a single flap 51, multiple flaps 51, base 53, or any combination of transportation packaging 50 surfaces. In certain embodiments, pattern 56 is located upon a largest surface (e.g. base 53, top flap 54, etc.). Pattern 56 depicts a general marking, path, outline, etc. of a shape to be removed from transportation packaging 50. Transportation packaging 50 may also include directions 72. Directions 72 may be either printed words or images that may assist or guide in the removal, assembly, engagement, or general usability of pattern 56 from transportation packaging 50.

Figure 3:
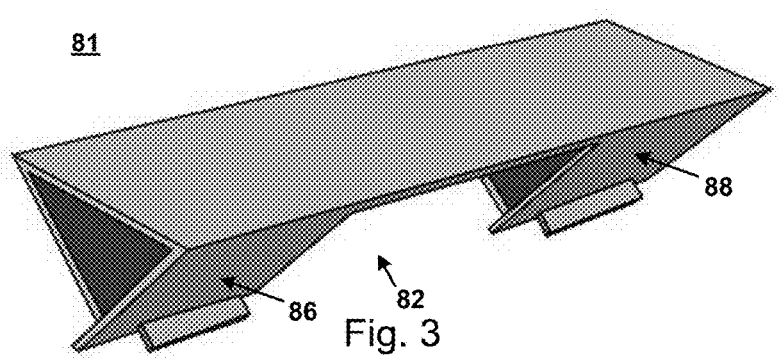
FIG. 3 depicts an assembled pattern according to embodiments of the present invention.

FIG. 3 depicts an assembled pattern 81 according to embodiments of the present invention. Assembled pattern 81 results from the removal of pattern 56 from transportation packaging 50. The removal of pattern 56 may occur subsequent to a user receiving a product (e.g. electrical device 20, etc.) shipped in transportation packaging 50. When the user removes the product from the transportation packaging 50 the user may remove pattern 56, assemble the pattern 81, and engage the assembled pattern 81 with the product.

In various embodiments, additional actions to removing pattern 56 may be used to create the assembled pattern 81. For instance, an alteration may be made to remove pattern 56 to create a portion 86 configured to engage with the product. An alteration may be a fold, crease, or any other action giving the removed pattern 56 three dimensions. Upon engagement, portion 86 may abut against, plug to, rest upon, or otherwise interact with the product. In other embodiments, another portion 88 configured to engage with the product may also be created. Portion 88 may likewise abut against, plug to, rest upon, or otherwise interact with the product upon engagement. In certain embodiments, an opening 82 may be included to properly or adequately engage with the product. Opening 82 may be any type of material recess to assembled pattern 81.

The shape of pattern 56 may dictate the resulting shape of assembled pattern 81. Therefore, assembled pattern 81 may take the form of many different shapes that may engage with the product in many different ways. In a particular embodiment, pattern 56 has a particular shape such that assembled pattern 81 takes the form of tray 30.

Figure 4:
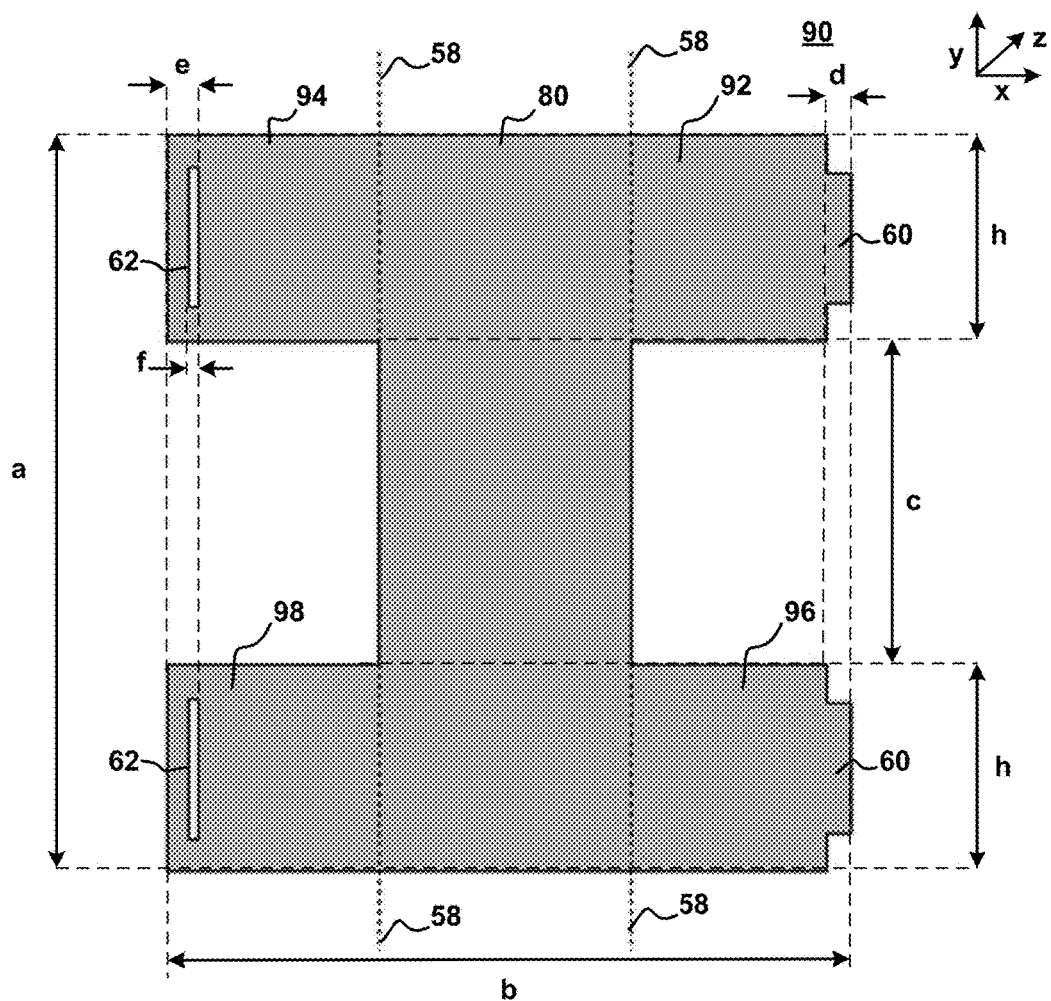
FIG. 4 depicts a removed pattern according to embodiments of the present invention.

FIG. 4 depicts an exemplary removed pattern 90 according to embodiments of the present invention. Removed pattern 90 may include a usability surface 80 and a plurality of appendages (e.g. appendage 92, appendage 94, appendage 96, appendage 98, etc.). The appendages 92 may connect to the usability surface 80 at an appendage-usability surface interface 58. In various embodiments, the appendages may be altered relative to the usability surface 80. The alteration may occur at the appendage-usability surface interface 58. A visual indication may be located at the appendage-usability surface interface 58 to aid with the alteration.

In certain embodiments appendages may be altered relative to the usability surface 80 as interacting pairs. For example, appendage 92 and appendage 94 may each be altered such that appendage 92 joins, attaches, interlocks, or generally interacts with appendage 94. In this manner, the interacting appendage 92 and appendage 94 may form a portion configured to engage with the product. Likewise appendage 96 and appendage 98 may each be altered such that appendage 96 interacts with appendage 98, thereby forming a second portion configured to engage with the product. In certain embodiments, appendage 92, appendage 94, appendage 96, and appendage 98 have a height dimension 'h', though the appendages may have differing heights. Appendage 92 and appendage 94 may be separated from appendage 96 and appendage 98 by a height dimension 'c' respectfully. In various embodiments dimension 'c' may be substantially similar to a particular feature of the product to which the assembled pattern 81 may engage. For example dimension 'c' may equal a width 'h' of the electronic device.

An appendage may also include an interaction feature that assists in the joining, attaching, interlocking, etc. of that appendage to another appendage. The interaction feature may be integral to the appendage (e.g. tab 60, slot 62, etc.) or added subsequent to the appendages interacting (e.g. staple, adhesive, etc.). In particular embodiments, there may be one interaction feature per interacting appendage pair, or one interaction feature per appendage. Where each appendage includes an interaction feature, each interaction feature may interact with the other to join, attach, interlock, etc. the respective appendages (e.g. tab 60 may be inserted into slot 62, etc.).

In the exemplary embodiment when tab 60 and slot 62 are utilized the tab 60 may have a width dimension 'd' and the slot 62 may be offset from an edge of an appendage by width dimension 'e'. Though dimension 'd' may differ from dimension 'e', in particular embodiments dimension 'd' is approximately equal to dimension 'e'. Slot 62 may have a width of dimension 'f' that may be approximately equal to the depth (in the z-axis) of the removed pattern 90.

To make a large assembled pattern 81, the pattern 56 may be located on the largest surface of transportation packaging 50 (e.g. base 53). For example, the dimensions 'a' and 'b' of removed packaging 90 may be equal to or less than a width and length of base 53. In a particular embodiment the dimensions 'a' and 'b' are maximized to the largest surface (e.g. base 53, etc.) dimensions.

Figure 5:
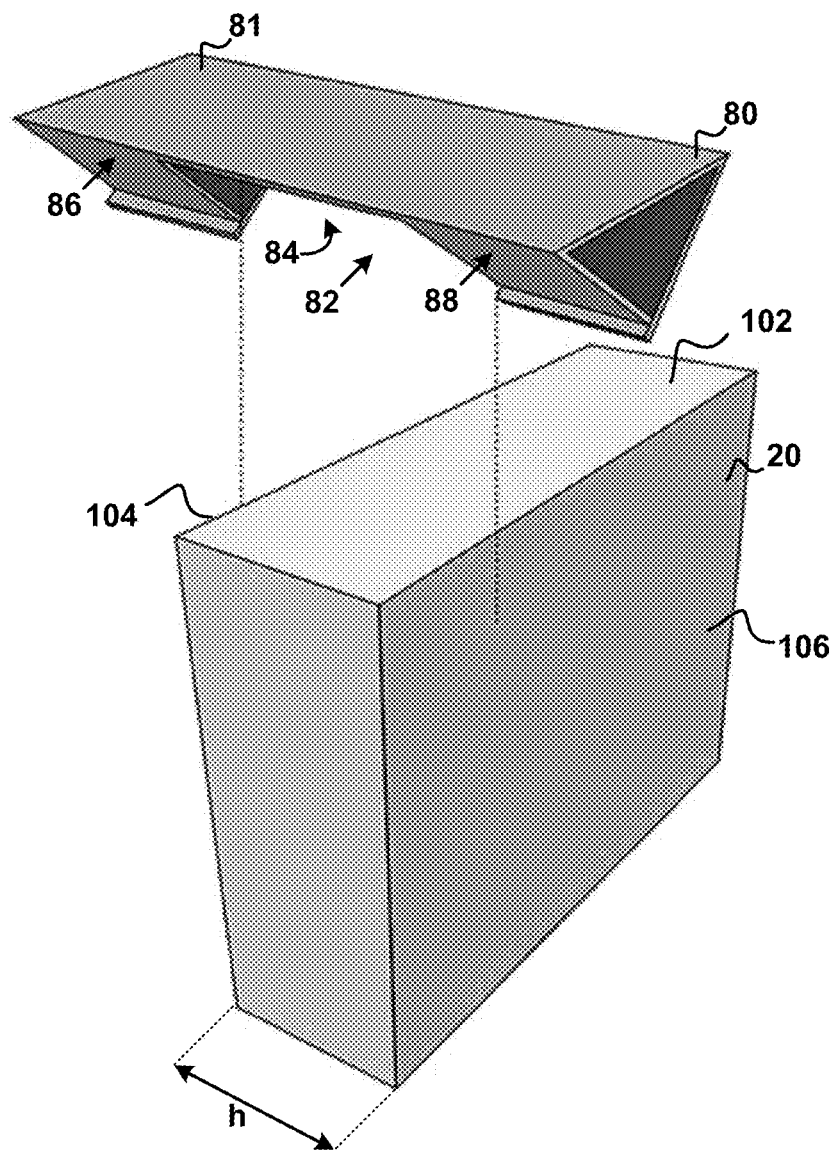
FIG. 5 depicts an assembled pattern being engaged with an electronic device according to embodiments of the present invention.

FIG. 5 depicts an assembled pattern 81 being engaged with an electronic device 20 according to embodiments of the present invention. As stated above in certain embodiments assembled pattern 81 may take the form of tray 30. Assembled pattern 81 includes at least a first portion 86 configured to engage with electronic device 20. When engaged with electronic device 20, portion 86 may abut against, plug to, rest upon, or otherwise interact with electronic device 20. For example, portion 86 may contact a side 104 of electronic device 20.

In other embodiments, a second portion 88 configured to engage with the product may also be created. Portion 88 may likewise abut against, plug to, rest upon, or otherwise interact with the product upon engagement. For example, portion 88 may contact a side 106 of electronic device 20.

In certain embodiments, opening 82 may be included to properly or adequately engage with the product. For example opening 82 allows a surface 84 that opposes usability surface 80 to rest upon a top surface 102 of electronic device 20.

Figure 6:
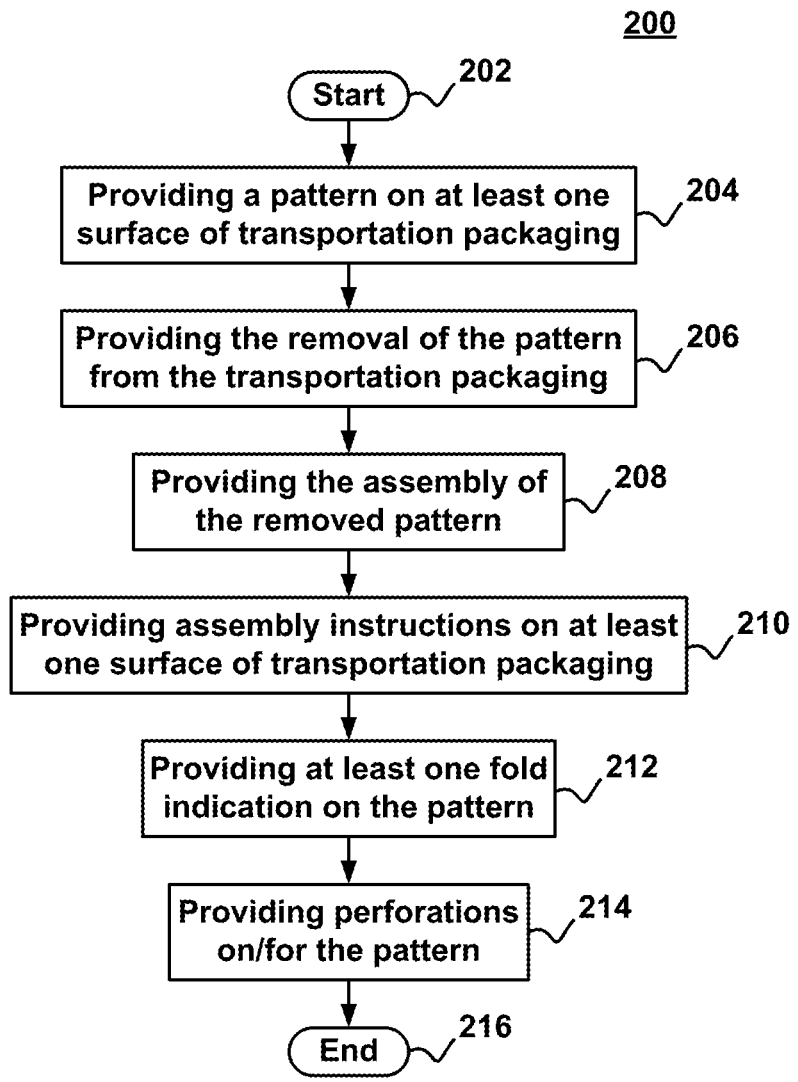
FIG. 6 depicts a method for providing the reuse of transportation packaging by providing for the engagement of the transportation packaging with the contents of the transportation packaging according to embodiments of the present invention.

FIG. 6 depicts a method 200 for providing the reuse of transportation packaging by providing for the engagement of the transportation packaging with the contents of the transportation packaging according to embodiments of the present invention. Method 200 beings at block 202 and may be used by, for example, transportation packaging 50 manufacturer, distributor, seller, etc. or by a product (e.g. electronic device 20) manufacturer, re-seller, etc.

At block 204, a pattern on at least one surface of transportation packaging is provided. In other words, a pattern on at least one surface of transportation packaging is supplied, given, allowed to occur, or is otherwise made available. At block 206, the removal of the pattern from the transportation packaging is provided for. In other words, the removal of the pattern from the transportation packaging is allowed to occur (e.g. a removable pattern is provided, perforations are provided, removal aids are provided, etc.). At block 208 the assembly of the removed pattern is provided for. In other words, the assembly of the removed pattern is allowed to occur (e.g. a pattern to be assembled is provided, assembly aids are provided, etc.).

At block 210, assembly instructions on at least one surface of the transportation packaging are provided. In other words, assembly instructions or images are supplied, given, or are otherwise made available. At block 212, a fold indication or a score line on the pattern is provided. In other words, a fold indication is supplied, given, or is otherwise made available or a score line is made, supplied, given, or is otherwise made available. At block 214, perforations on or for the pattern are provided. In other words, perforations are supplied, given, or is otherwise made available. Method 200 ends at block 216.

Figure 7:
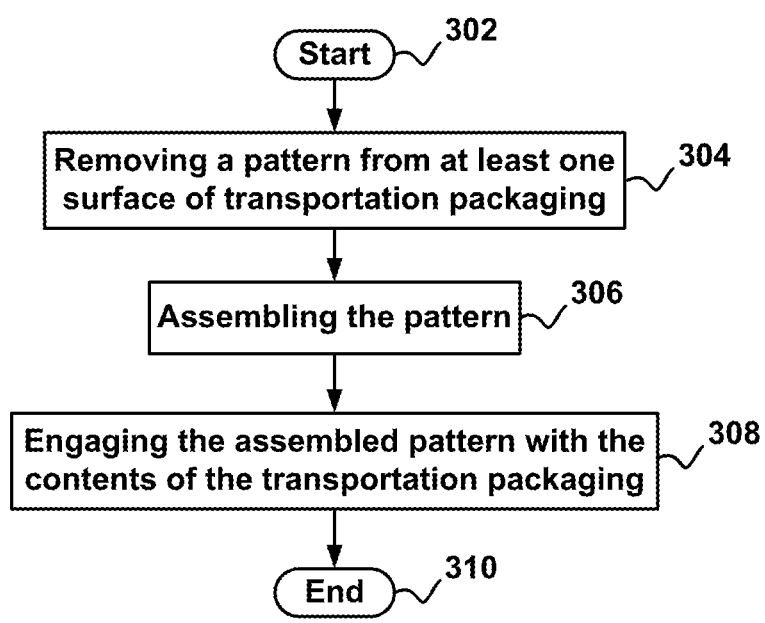
FIG. 7 depicts an alternative method for providing the reuse of transportation packaging by providing for the engagement of the transportation packaging with the contents of the transportation packaging according to embodiments of the present invention.

FIG. 7 depicts a method 300 for providing the reuse of transportation packaging by providing for the engagement of the transportation packaging with the contents of the transportation packaging according to embodiments of the present invention. Method 300 beings at block 302 and may be used by, for example, a product purchaser (e.g. electronic device 20 buyer, etc.).

At block 304, a pattern is removed from at least one surface of transportation packaging. For example, a user may cut, tear, or otherwise remove the pattern from the packaging used in the shipment or transport of a product. At block 306, the pattern is assembled. For example, the pattern may be altered, folded, creased, or otherwise given three dimensions. At block 308, the assembled pattern is engaged with the contents of the transportation packaging. For example, the assembled pattern may abut against, plug to, rest upon, or otherwise interact with the product. Method 300 ends at block 310.

The functions noted in the blocks of method 200 and method 300 may occur out of the order noted in the figures. For example, two blocks shown in succession may, in fact, be executed concurrently, or the blocks may sometimes be executed in the reverse order, depending upon the functionality involved.

The invention claimed is:

1. A method of providing the reuse of transportation packaging for the transport of an electronic device, the method comprising:

providing a pattern on at least one surface of the transportation packaging, the pattern defining a portion of the transportation packaging to be removed from the transportation packaging and assembled, the assembled pattern comprising a first portion that engages with a first side of the electronic device and a second portion that engages with a second side of the electronic device.

2. The method of claim 1 wherein upon the engagement of the assembled pattern with the electronic device, the assembled pattern comprises a usability surface for at least one peripheral device that communicates with the electronic device.

3. The method of claim 1 further comprising:
providing assembly instructions on the pattern.

4. The method of claim 1 further comprising:
providing at least one fold indication on the pattern.

5. The method of claim 1 wherein providing a pattern on at least one surface of the transportation packaging further comprises:
perforating the pattern.

6. The method of claim 1 wherein the pattern is provided upon a largest surface of the transportation packaging.

7. The method of claim 1 wherein the first side of the electronic device and the second side of the electronic device are opposing.

8. The method of claim 1 wherein the first portion and the second portion are separated by an opening to engage with the electronic device.

9. Transportation packaging for transporting an electronic device comprising:

a pattern on at least one surface of the transportation packaging that defines a portion of the transportation package to be removed and assembled subsequent to the transport of the electronic device, the assembled pattern comprising a first portion that engages with a first side of the electronic device and a second portion that engages with a second side of the electronic device.

10. The transportation packaging of claim 9 wherein the assembled pattern further comprises a usability surface for at least one peripheral device that communicates with the electronic device.

11. The transportation packaging of claim 9 further comprising:
assembly instructions on at least one surface of the transportation packaging.

12. The transportation packaging of claim 9 further comprising:
at least one fold indication on the pattern.

13. The transportation packaging of claim 9 wherein the pattern is formed by a plurality of perforations of the transportation packaging.

14. The transportation packaging of claim 9 wherein the pattern is on a largest surface of the transportation packaging.

15. The transportation packaging of claim 9 wherein the first portion and the second portion are separated by an opening to engage with the electronic device.

16. The transportation packaging of claim 11 wherein the assembly instructions are outside the pattern.

17. The transportation packaging of claim 9 wherein the first side of the electronic device and the second side of the electronic device are opposing.

18. The transportation packaging of claim 9 wherein the assembled pattern further comprises a plurality of interaction features to join a first pattern appendage to a second pattern appendage.

19. The transportation packaging of claim 18 wherein the interaction features are integral to the first pattern appendage and second pattern appendage respectively.

20. The transportation packaging of claim 18 wherein the interaction features are added to the first pattern appendage and second pattern appendage subsequent to the joining of the first pattern appendage and second patter appendage.

\* \* \* \* \*